(12) United States Patent
Ostertag et al.

(10) Patent No.: US 12,711,135 B2
(45) Date of Patent: Aug. 18, 2026

(54) OPTIMIZED MATERIALIZATION IN TOP-K QUERIES

(71) Applicant: SAP SE, Walldorf (DE)

(72) Inventors: Alexander Ostertag, Karlsruhe (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/817,120

(22) Filed: Aug. 27, 2024

(65) Prior Publication Data

US 2026/0064690 A1 Mar. 5, 2026

(51) Int. Cl.
*G06F 16/2453* (2019.01)
*G06F 16/248* (2019.01)

(52) U.S. Cl.
CPC .. *G06F 16/24545* (2019.01); *G06F 16/24549* (2019.01); *G06F 16/248* (2019.01)

(58) Field of Classification Search
None
See application file for complete search history.

(56) References Cited

U.S. PATENT DOCUMENTS 7,921,100 B2 * 4/2011 Hadjieleftheriou .......................... G06F 16/2453 707/728
10,545,960 B1 * 1/2020 Zhu ..................... G06F 16/2282
11,966,399 B1 * 4/2024 Lui ................... G06F 16/24554
2012/0271838 A1 * 10/2012 Whang ..................... G06F 7/22 707/E17.104
2017/0139981 A1 * 5/2017 Wein ................... G06F 16/2322
2018/0349439 A1 * 12/2018 Zhang ............... G06F 16/24542

* cited by examiner

*Primary Examiner* — Dawaune A Conyers
(74) *Attorney, Agent, or Firm* — Mintz Levin Cohn Ferris Glovsky and Popeo, P.C.

(57) ABSTRACT

In some implementations, there is provided query execution optimization for a top k query that includes in response to a first value being less than a first heap value, selectively materializing a second value corresponding to a second field and inserting the first value and the second value into the heap, and in response to the first value not being less that the first heap value, skipping the first incoming element and proceeding, when available, to another incoming element. Related systems, methods and articles of manufacture are also disclosed.

18 Claims, 11 Drawing Sheets

TableT1.A

102

| rowPos | ValueId(A) |
|---|---|
| 1 | 33 |
| 2 | 36 |
| 3 | 34 |

Value-to-ValueID Dictionary for Table T1.A

106

| Value | ValueId(A) |
|---|---|
| James | 33 |
| Philip | 36 |
| Michelle | 34 |

| Table A | Table B |
| --- | --- |
| 1 | 3 |
| 1 | 2 |
| 2 | 4 |
| 2 | 5 |
| 3 | 1 |

| A | B |
| --- | --- |
| 1 | 3 |
| 1 | 2 |
| 2 | 4 |

| A | B |
| --- | --- |
| 3 | 1 |
| 1 | 2 |
| 1 | 3 |

| A | B |
| --- | --- |
| 1 | 2 |
| 1 | 3 |
| 2 | 4 |

TableT1.A

102

| rowPos | ValueId(A) |
|---|---|
| 1 | 33 |
| 2 | 36 |
| 3 | 34 |

Value-to-ValueID Dictionary for Table T1.A

106

| Value | ValueId(A) |
|---|---|
| James | 33 |
| Philip | 36 |
| Michelle | 34 |

OPTIMIZED MATERIALIZATION IN TOP-K QUERIES

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided query execution optimization associated with a top k query operation. In some embodiments, there is provided a method that includes receiving a query request including a top k query operator over at last two fields comprising a first field and a second field, wherein k defines a threshold limit of query results for the top k query operator; reading a first incoming element as a first value identifier of the first field; selectively materializing a first value from the first value identifier; comparing a top element of a heap to the first incoming element by at least: comparing a first value materialized from the first value identifier to a first heap value of the top element of the heap, in response to the first value being less than the first heap value, selectively materializing a second value corresponding to the second field and inserting the first value and the second value into the heap, and in response to the first value not being less that the first heap value, skipping the first incoming element and proceeding, when available, to another incoming element; and in response to the comparing, responding to the query request by providing the heap including a top k set of query results.

In some variations, one or more features disclosed herein including one or more of the following features may be implemented as well. The selectively materializing the first value from the first value identifier may only include materializing the first value corresponding to the first field and does not materialize the second value corresponding to the second field. The reading may further include reading a row position of the second field. The selectively materializing the second value corresponding to the second field may include using the row position to identify a second value identifier and materializing, based on the second value identifier and a second dictionary, the second value. The selectively materializing the first value from the first value identifier may include using the first value identifier to materialize, based a first dictionary, the first value. The query request may be received from a client device. In response to the first value being equal to the first heap value, the second field may be materialized to provide the second value and comparing the second value to a second heap value of the top element of the heap. In response to the heap not being full, a database execution engine may read the first value identifier of the first field and a second value identifier of the second field, and materialize, based on the first value identifier and the second value identifier, the first value and the second value, and inserts the first value and the second value into the heap.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable storage medium or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
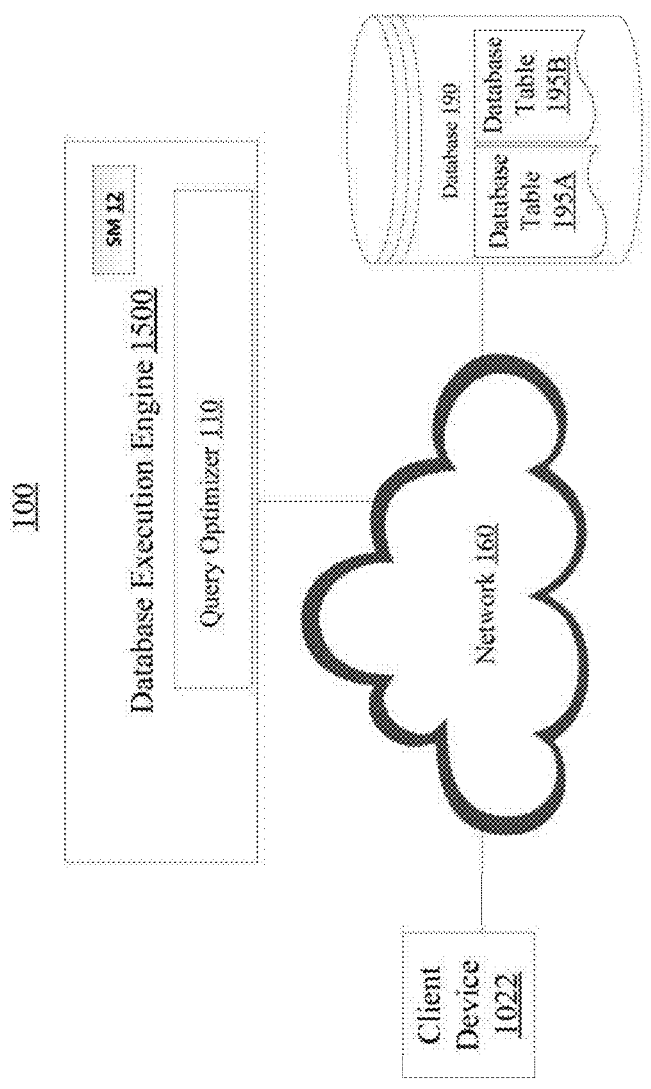
FIG. 1A illustrates an example of a system diagram for handling top k query operations, in accordance with some implementations.

FIG. 1A depicts a system diagram illustrating an example of a system 100 in which selective materializations in top k query operations may be used in accordance with some implementations. Referring to FIG. 1A, the system 100 may include one or more client devices such as client device 1022, a database execution engine 1500, and one or more databases, such as a database 190. As shown in FIG. 1A, the client device 1022, the database execution engine 1500, and the database 190 (which may include one or more database tables 195A-B) may be communicative coupled via a network 160. The database execution engine may also include a query optimizer 110.

The one or more databases such as the database 190 may include a variety of relational database technologies including, for example, an in-memory database, a column-based database, a row-based database, a hybrid database (e.g., combination of column and row based), and/or the like. The one or more client devices such as client device 1022 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

In the case of an in-memory relational database system, the in-memory relational database may utilize main memory ("in-memory") for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results. Although some of the examples refer to an in-memory database, the subject matter disclosed herein with respect to the custom table scans for top query operators may be used with other types of databases as well.

In some embodiments, a client device 1022 may send a query towards the database execution engine 1500, where the query is received. The database execution engine 1500 may include a selective materializer (SM) 12. The SM may selectively materialize elements being compared to a heap during a top K heap comparison. For example, at query execution time, a database execution engine may perform this comparison.

Figure 1B:
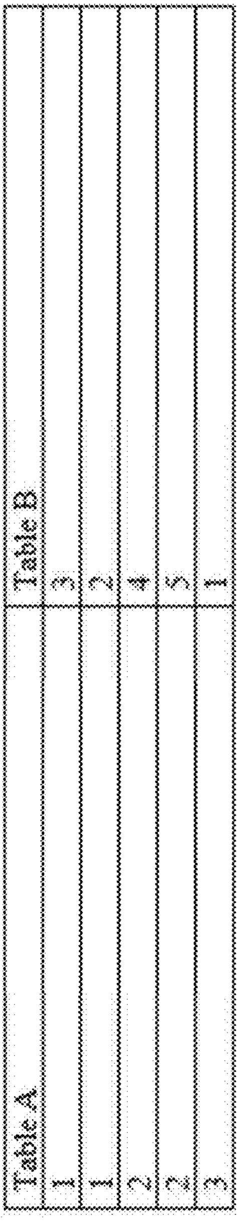
FIG. 1B depicts two columns, one from table A and one from table B, used for a top k query, in accordance with some implementations.
Figure 1C:
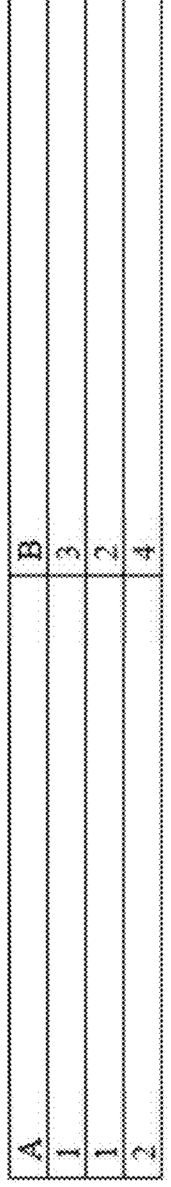
FIGS. 1C, 1D, 1E, 1F, 1G, and 1H depict examples of results for top k queries using a heap and heapsort comparison, in accordance with some implementations.

A query may invoke selecting a top k quantity of values from a table. For example, an ordered (e.g., sorted) top k operation may determine and output a sorted list of the smallest k elements from an unsorted input. FIG. 1B depicts two columns, one from table A and one from table B. At table A, the first field correspond to the value "1" and the second field corresponds to the value 3, for example. In the second row of table A, the first field corresponds to the value "1" and the second field is "2", for example. In a simple query for the top k, there may be a single comparison criterion, such as select the top k values from column 1 at table A. But the top k may involve more complex queries that determine the top k over multiple columns as shown at FIG. 1B. For example, a query may be of the following form: "select top 3*from t1 order by a." This query selects the top 3 rows and orders them by the elements of the column ("A"). In other words, the query may select the smallest 3 rows from the table and order them. The results of this select query is depicted at FIG. 1C.

Figures 1D, 1E:
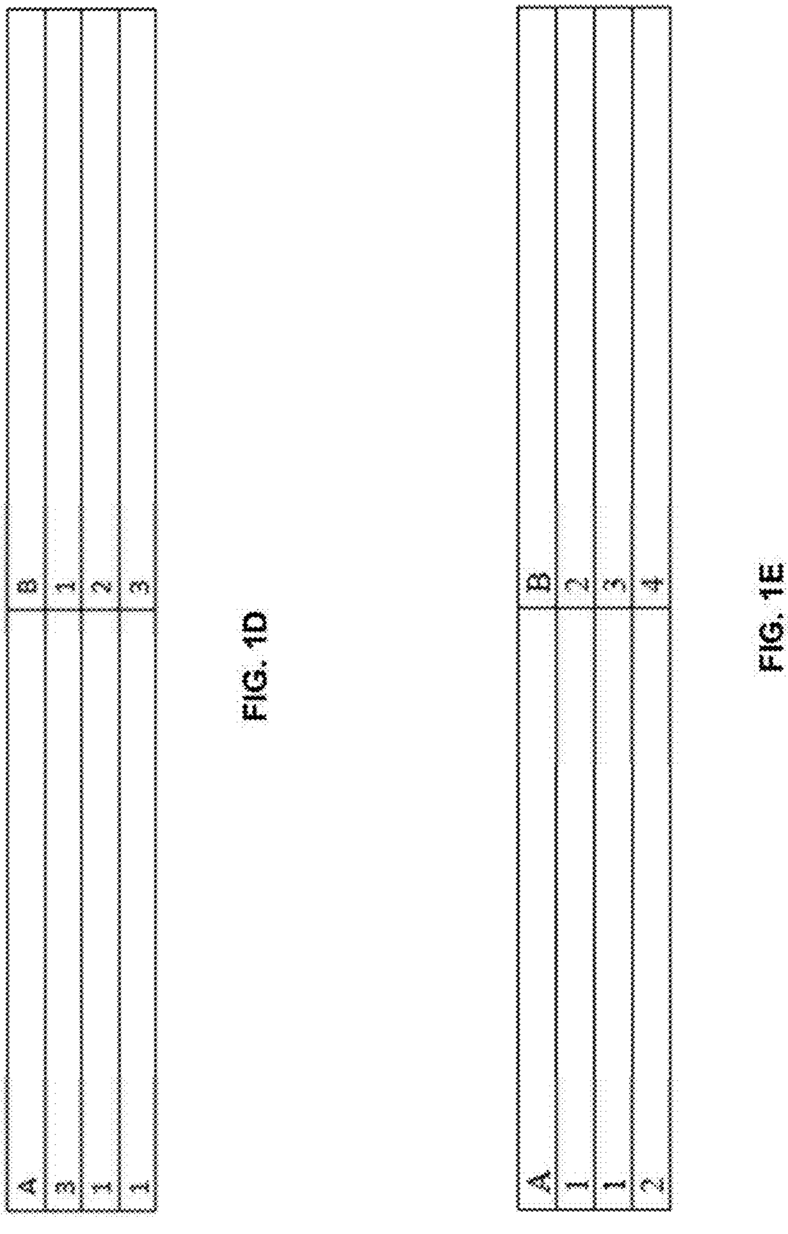

Another example is a query of the following form: "select top 3*from t1 order by b."." This query selects the top 3 rows (or, e.g., smallest 3) and orders them by the elements of the column ("B"). The results of this select query is depicted at FIG. 1D. Although the some of the examples refer to the top 3 rows, these rows may be the smallest (with respect to values of the elements of the rows) 3.

Another example query is of the following form: "select top 3*from t1 order by a,b." This query selects the top 3 (or, e.g., smallest 3) rows and orders them by the elements of columns "A" and "B". The results of this select query is depicted at FIG. 1E.

A heap sort ("HeapSort") algorithm may be used to determine the top k queries. For example, a heap of size k (which corresponds to "k" of the top k) is created, and the heap is updated for incoming row elements as they are read from the database table. Algorithm Table A below depicts an example heap sort algorithm to determine the top k elements in the table(s) being queried.

Figures 1F, 1G, 1H:
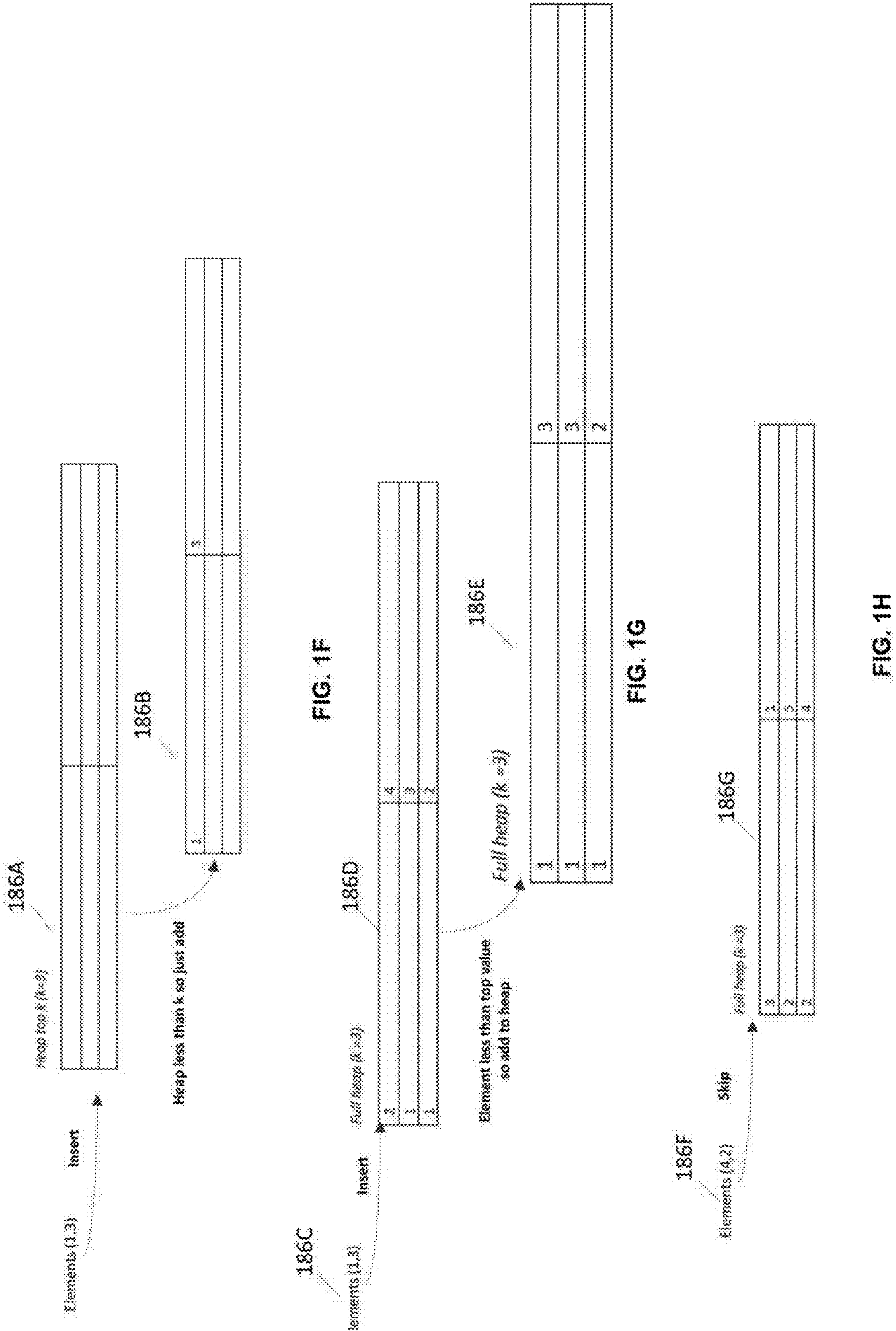

In the case of the algorithm of Algorithm Table A, when the size of the heap is initially less than k, an incoming element 186A (e.g., row 1 (1,3) of FIG. 1B) is added to the heap 186B as shown at FIG. 1F. But when the heap is full, the incoming element 186C (e.g., row 1 (1,3) can be compared to the top element of the heap 186D, and the root (or top) node of the heap is updated with the incoming element, when the incoming element is a smaller value than the root node as shown at 186E of FIG. 1G. The heap invariant is restored (e.g., by siftDownFirst( ) procedure where the heap invariant refers to a property of the heap where each node has a smaller key than its children). But if the incoming element 186F is not smaller than the root node 186G, the incoming element does not belong to the top k elements of the heap, so the incoming element is just skipped (i.e., not added to the heap) as shown a FIG. 1H. After all input elements from a table (or, e.g., a row or from an intermediate operation such as filtered tables and the like) have been processed by the algorithm of Algorithm Table A, the heap includes the top k elements.

Algorithm Table A

```
Naïve top-k HeapSort
Heap heap; // create empty heap.
For each input row r:
  materialize(r) // Materialize all fields of row r.
  If heap.size( ) < k:
    heap.insert(r)
  Else if r < heap.top( ):
    swap(heap.top( ), r)
    heap.siftDownFirst( )
heap.sort( )
return heap
```

Figure 2A:
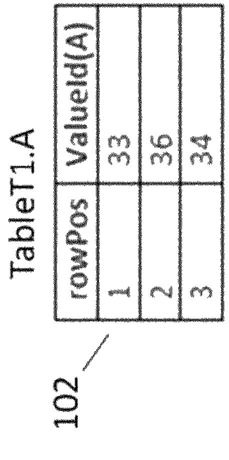
FIG. 2A depicts an example of a database table where only the value identifiers are stored in a table, in accordance with some implementations.

In some databases, the data in the tables are stored using dictionary compression. For example, rather than store the actual values in the database tables, a valueID (also referred to as a vector) is stored. As such, materialization is used to determine the actual value based on the valueID. FIG. 2A depicts an example of a database table 102 where only the valueIDs are stored in the table T1.A. If the actual value represented by "33" at row position 1 is needed, a dictionary 106 is used to materialize the corresponding value "James". Materialization refers decompressing or converting (using, e.g., a dictionary) the valueID contained in a database table into the actual value. This materialization can be very costly from a resource perspective (e.g., memory, processor, network, and overall query time) in a top k query. In short, the materialization needed for the heapsort algorithm of for example Algorithm Table A may lead to bottlenecks and poor performance with overutilization of limited resources at the database management system.

In some embodiments, there is provided selective materializations during operations associated with a top k query operation to reduce the overall quantity of materializations associated with the top k query.

Before providing additional description with respect to the selective materializations in a top query process, the following provides an additional example system environments for query handling.

Figure 2B:
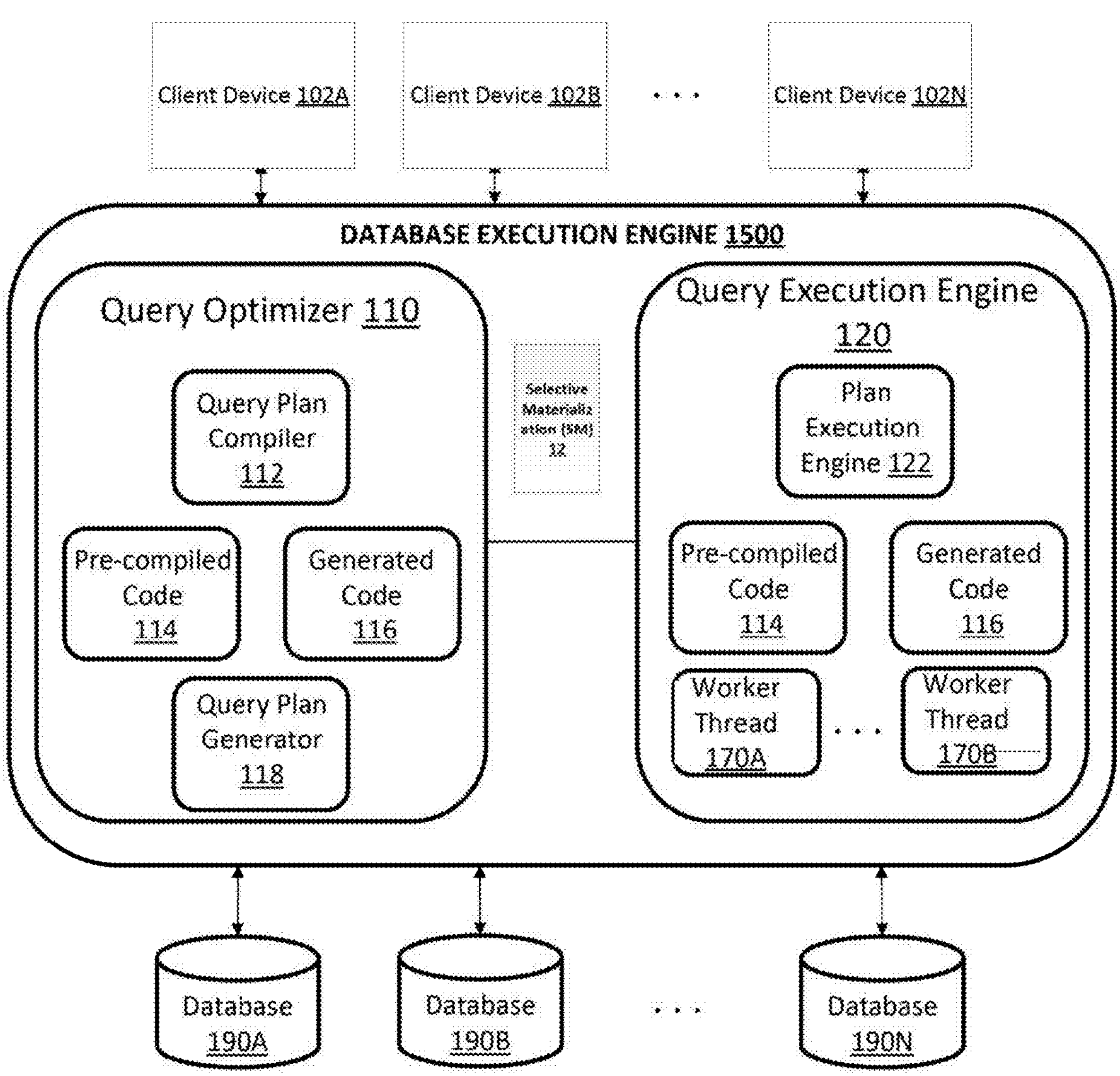
FIG. 2B depicts an example of a system diagram illustrating another example of a system where the selective materializations may be implemented, in accordance with some implementations.

FIG. 2B depicts a block diagram illustrating another example of a system where the selective materializations may be implemented. Referring to FIG. 2B, another example of a database execution engine 1500 is depicted, although other types of database execution engines and query optimizers 110 may be used as well.

As shown in FIG. 2B, the one or more databases may include a first database 190A, a second database 190B, and a third database 190C, and the database(s) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102A-102N may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 1022 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" and may be in the form of a directed acyclic graph. The query plan may propose an optimum query plan with respect to, for example, the execution time of the overall query. To optimize a query, the query optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120. For example, during execution of pre-compiled and/or generated code, the database execution engine may perform the top k comparison between the selectively materialized element(s) and a heap during a top k heap comparison.

The query optimizer 110 may optimize the query plan (which may include the noted pipelines of operators) by compiling and generating code. Furthermore, the query optimizer may generate a DAG including operators that may be configured into one or more pipelines. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 1022. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of the databases 190A-N.

The query execution engine 120 may, as noted, be configured to handle different types of databases and the corresponding persistent layers and/or tables therein. For example, the one or more databases 190A-N may include at least one row-oriented database, in which case an insert is performed by adding a row with a corresponding row identifier. Alternatively and/or additionally, the one or more databases 190A-N may include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to optimize execution of query related operations. In addition, the query execution engine 120 may provide for a plan execution framework that is able to handle data chunk (s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 1500 may divide the database table 195 into multiple fragments by applying one or more of a hash partitioning, round robin partitioning, and range partitioning.

In some implementations, the database execution engine may use parallelization and pipelining.

In a parallelization framework for example, a database execution engine (which may also be referred to as a query execution engine or an execution engine, for short) may divide a query accessing a dataset (e.g., one or more database tables) into a quantity of tasks determined based on the quantity of time required to execute the query on a portion of the dataset. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

Moreover, the database execution engine may also use pipelining. In the case of pipelining, the database execution engine breaks up data into smaller chunks of data, such that each smaller chunk of data can be processed by a series of one or more operators. The operators refer to low-level operators, such as code that performs a specific operation during operator execution, rather than a high-level relational algebra operator. For example, the low-level operator may implement a lock on a database table, perform an index scan, perform a table scan at a given database, perform a limit operation (e.g., LimitOp), and/or the like. During query plan generation and optimization, these low-level operators may be connected with each other to form a graph, such as a directed acyclic graph (DAG). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that the output of one element of the pipeline is the input of the next element of the pipeline, and buffer storage may be used between the elements. In some instances, the operators of a pipeline can be executed in parallel, sequentially, or in time-sliced fashion.

The database execution engine 1500 may include the selective materialization (SM) 12 that selectively materializes elements as part of a top k heap comparison.

In some embodiments, there is provided a query performance optimization that can save one or more materializations (e.g., using a dictionary to selectively materialize the database value from a valueID stored in the database table) during a heap sort used in a top k query process. Specifically, the SM 12 may not determine that a database column might not need to be materialized when (or in response to) a comparison result already available from a prior comparison of a prior column.

Figures 3A, 3B, 3C:
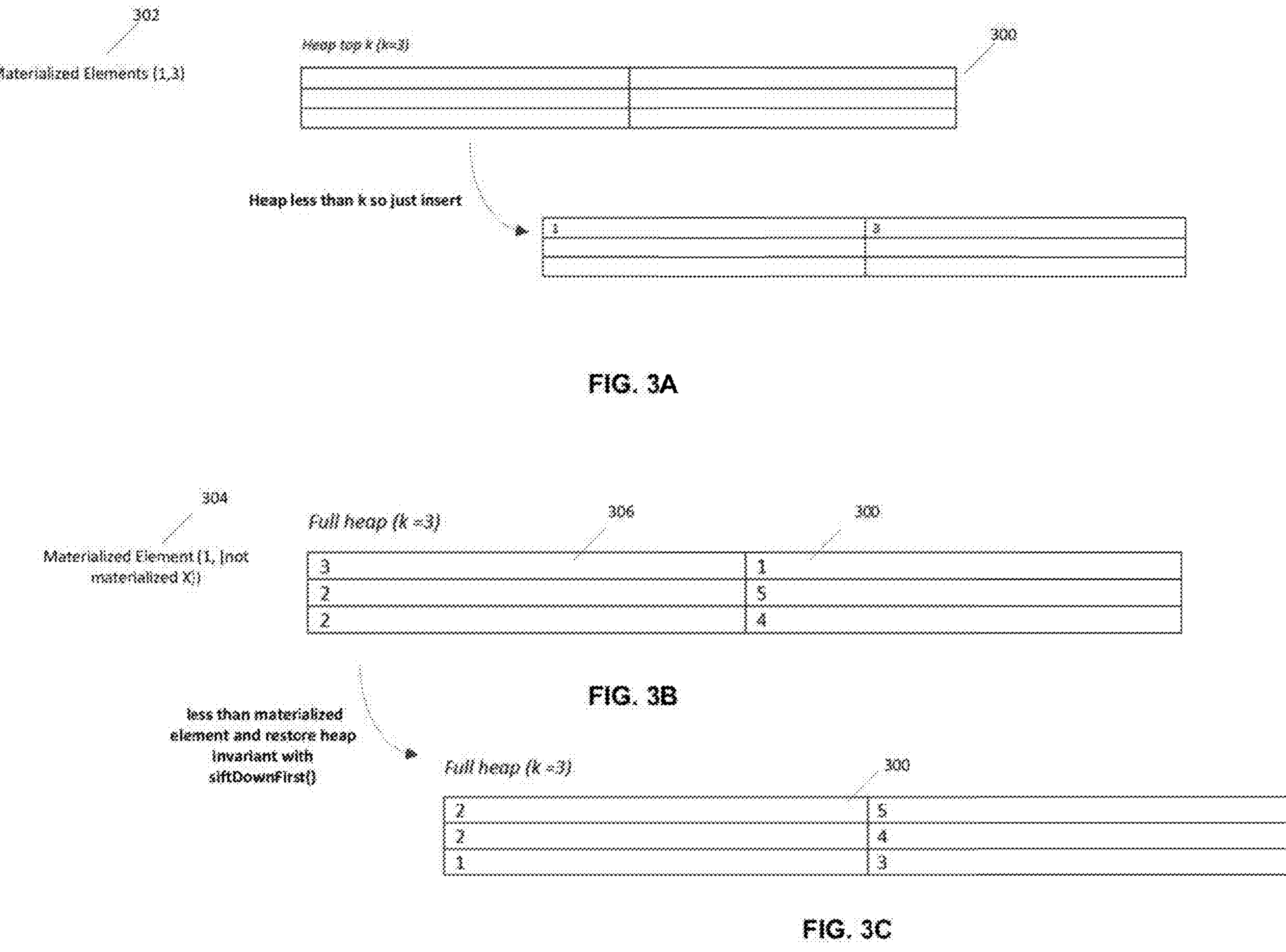
FIGS. 3A, 3B, 3C, 3D, and 3E depict examples of results for top k queries using a heap and heapsort where selective materializations are used during the comparison, in accordance with some implementations.

Referring to FIG. 3A, if the heap 300 structure (which in this example is for a top k equals 3) does not contain k (e.g., 3 elements), the valueIDs scanned from the database table are materialized and inserted into the heap. For example, the database execution engine may read the valueIDs from a first column at table A and a second column at table B. Next, the database execution engine may, using a dictionary, materialize the valueIDs into the incoming element 302, which in this example is 1, 3. As the heap 300 has fewer than k elements, the incoming element 302 is inserted into the heap 300 as shown at FIG. 3A.

When the heap 300 is full as shown at FIG. 3B, only the first field of the incoming element is materialized. For example, the database execution engine may read only the value ID from a first column (or, e.g., first field) at table A and just the row position X of the second column (or, e.g., second field) of table B. Alternatively, the valueID of the first column of table A and the valueID of the second column at table B may be read. Unlike FIG. 3A, the database execution engine may, using a dictionary, materialize the value from the valueID for only the first field of the incoming element 304 but does not materialize the value from the valueID of the second field. In the example of FIG. 3B, the incoming element 304 include a value "1" (which is the materialized value of the first field from table A) but the second field (which corresponds to table B) is not materialized as indicated by the row position "X"). Next, the database execution engine may compare the materialized value "1" 304 to the first field 306 of the top element of the heap 300. As the materialized value "1" 304 is smaller than the first field "3" 306 in this example, the comparison result yields a "less than", so the elements 304 are part of the top k elements of the heap 300. When this is the case, the database execution engine materializes the second field (which corresponds to table B and in this example materializes to "3"). For example, using the row position X, the database execution engine materializes, using a dictionary and valueID for row position X, the value corresponding to the second field of row X. Next, the database execution engine inserts the incoming row element 1, 3 into the heap 300 as shown at FIG. 3C.

Figures 3D, 3E:
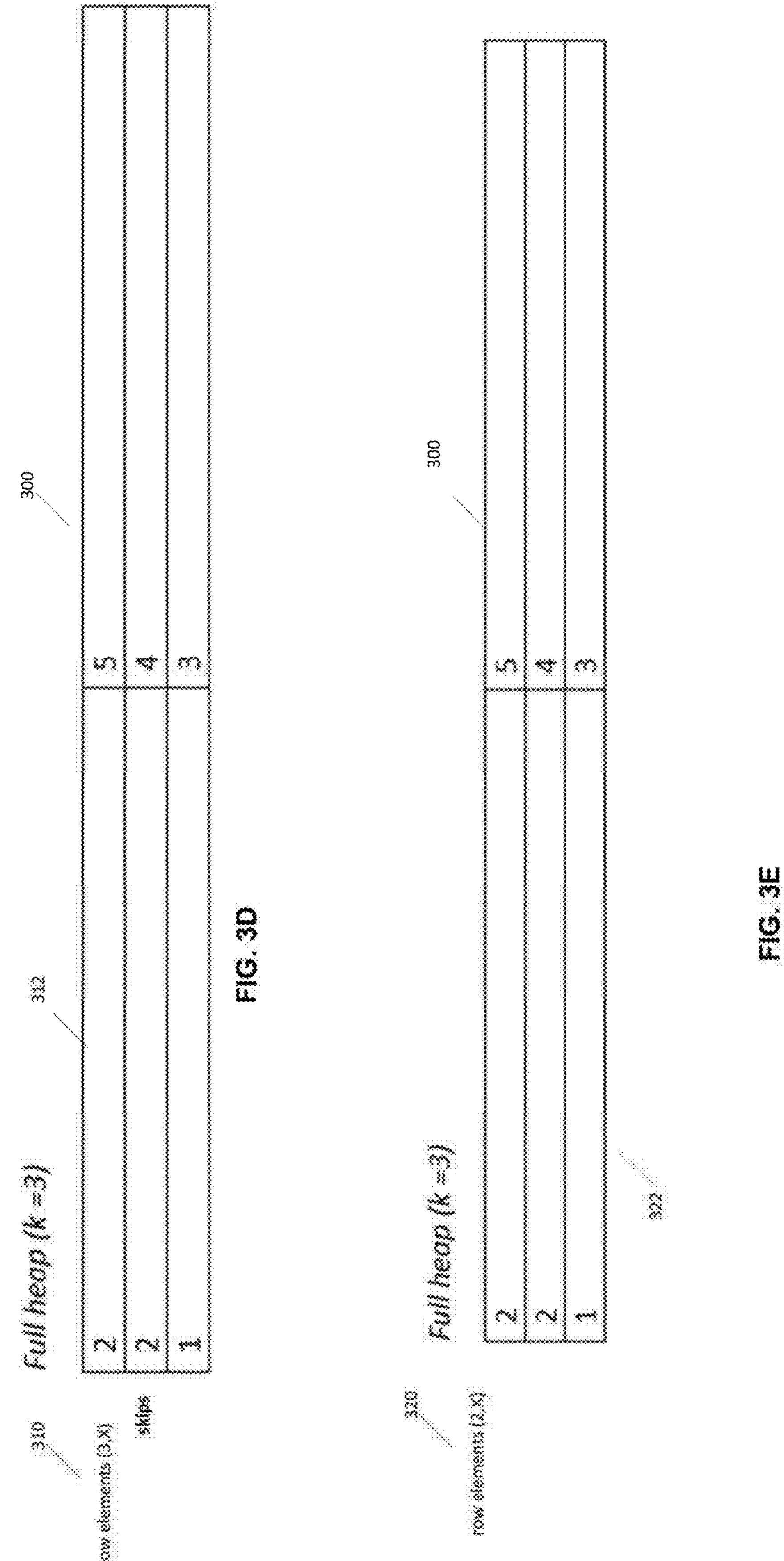

Continuing the example, the database execution engine may read another row from tables A and B, and may selectively materialize a first field of table A having a value "3" 310 but does not materialize the second field (but merely reads the row position "X") from table B as shown at FIG. 3D. In this example, the database execution engine performs a comparison between the value "3" and the top value "2" 312 of the first field of the heap 300. As the comparison reveals that the value "3" is greater than the top k value "2" of the heap, the database execution engine skips row element 310 and does not materialize the valueID of the second field at row position "X" of database table B.

Further continuing with the example, the database execution engine may read another row from tables A and B, and again may selectively materialize a first field of table A having a value "2" 320 of FIG. 3E but does not materialize the second field (but merely reads the row position "X") of the second field from table B. In this example, the database execution engine performs a comparison between the value "1" and the top value "1" 322 (see, e.g, FIG. 3E) of the first field of the heap 300. As the comparison reveals that the value "1" is equal to the top k value "1" of the heap, the database execution engine needs to selectively materialize the second field at the row position to perform the comparison. If for example, the materialized value is 1 at the row position X, the database execution engine would insert the top element by the value 2,1 and restore heap invariant. But if the materialized value is 4 for the row position X, the database execution engine would skip the incoming element of 2, 4. But if the materialized for value is 3 for the row position X, the database execution engine may materialize another value of the input row (assuming a third value in the row, such as column C), and the comparison repeats to determine whether to insert the incoming row into the top of the heap.

Figure 4:
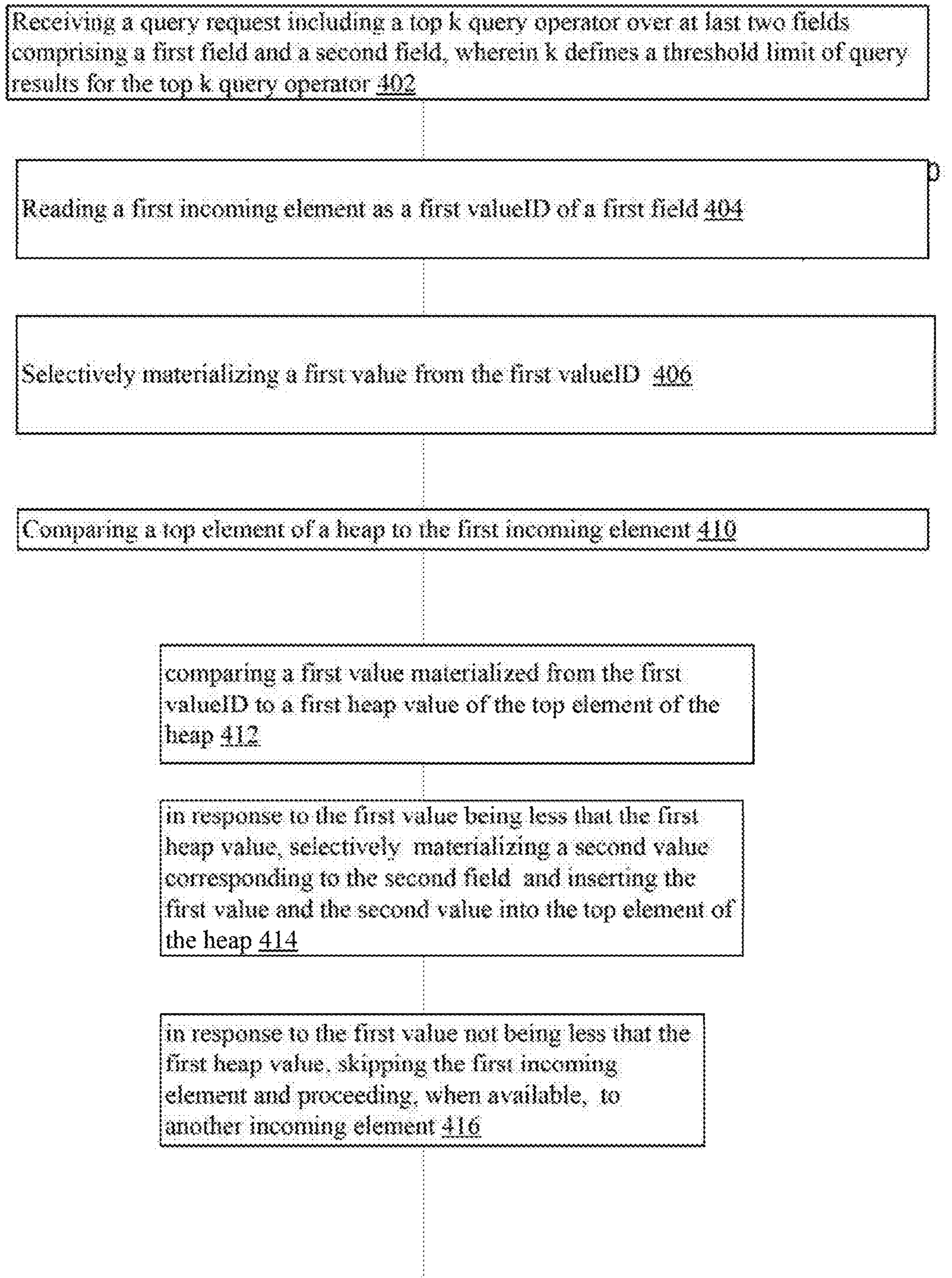
FIG. 4 depicts an example of optimization of top k queries using selective materializations, in accordance with some implementations.

FIG. 4 depicts a flowchart illustrating an example of a process 400 for optimizing queries using a top k operator, in accordance with some implementations.

The process 400 may include at 402 receiving a query request including a top k query operator over at last two fields comprising a first field and a second field, such as columns of a database, wherein k defines a threshold limit of query results for the top k query operator, in accordance with some implementations. For example, the database execution engine 1500 may receive a request for a top k query from a client device, such as client device 1022. The value of "k" defines the threshold limit of values for the result set. Moreover, the query may select the top k over two fields, such as two columns, of a database. For example, the query may select the top 3 rows and orders them by the elements of columns "A" and "B" as shown by the following: "select top 3*from t1 order by a,b."

The process 400 may include at 404 reading a first incoming element comprising a first valueID. Referring to the example of FIG. 3B, the database execution engine 1500 may read valueID for the first field from table A at FIG. 2A (given that table A uses dictionary compression and stores the values as valueIDs). Alternatively, or additionally, the database execution engine may read the row position X of the second column (or, e.g., second field) of table B. Alternatively, or additionally, the database execution engine may read the valueID of the second column (or, e.g., second field) at table B (given that table B uses dictionary compression and stores the values as valueIDs).

The process may include at 406 selectively materializing a first value from the first valueID, in accordance with some embodiments. For example, the database execution engine may selectively materialize the first valueID for only the first field of the incoming element 304 but does not materialize the second value of the second field as shown by the "1,X" at FIG. 3B.

The process 400 may include at 410 comparing a top element of a heap to the first incoming element. For example, the database execution engine may compare the top element (3,1 at 306 of FIG. 3B) to the first incoming element, such as 304. This comparison may include comparing, at 412, a first value materialized from the first valueID, such as the value "1" at 304, to a first heap value "3" of the top element of the heap as shown at the example of FIG. 3B. in response to the first value being less than the first heap value, selectively materializing a second value corresponding to the second field and inserting the first value and the second value into the heap (e.g., removing the existing top element from the heap and restoring the heap invariant).

In response to the first value, such as the value "1" being less that the first heap value, such as the value "3", the database execution engine may selectively materialize, at 414, a second value (which corresponds to the second field) from the second valueID, so in the example of FIG. 3B, the second value at the row position "X" is materialized (e.g., to the second value "3"), and the database execution engine may insert the first value and the second value into the heap (e.g., alternatively, or additionally, the heap invariant is restored with the use of the siftDownfirst( ) as shown in the example of FIG. 3C). In response to the first value not being less that the first heap value, the database execution engine may skip at 416 the first incoming element and may proceed, when available, to another incoming element. For example, if the first value of the next incoming element is "3" as shown at FIG. 3D, the database execution engine skips this incoming element and obtains (if in the database table) another element for the heap comparison.

The process 400 may include responding, at 418, to the query request by providing the heap including the top k, in response to the comparing. When the heap comparisons are completed (e.g., the incoming elements from a table or tables are processed through the heap sort), the heap may return the elements of the heap, such as the top 3 rows of the heap as the top k result. Alternatively, or additionally, the heap may not need to be sorted as part of the comparison.

Algorithm B below depicts an example heap comparison algorithm consistent with some implementations.

Algorithm Table B

```
Optimized top-k HeapSort
  Heap heap; // create empty heap.
  For each input row r:
    If heap.size( ) < k:
      materialize(r) // Materialize all fields of row r.
      heap.insert(r)
    Else:
      tryUpdateHeap(heap, r)
  heap.sort( )
  return heap
Procedure tryUpdateHeap(Heap heap, input row r):
  top = heap.top( )
  For columnIdx in range (0, numSortingColumns):
    Materialize_columnIdx (r) // Materialize field of corresponding columnIdx
    If r[column] < top[column]:
      Materialize_columnIdx...numSortingColumns-1 (r) // Materialize remaining fields.
      swap(top, r)
      heap.siftDownFirst( )
      Return
    // For the last column, we can ignore the row if it is equal to the top element
    Else if r[column] > top[column] or columnIdx == numSortingColumns-1:
      Return
    // Comparison yielded "equal", so we need to continue with next column.
```

Figure 5A:
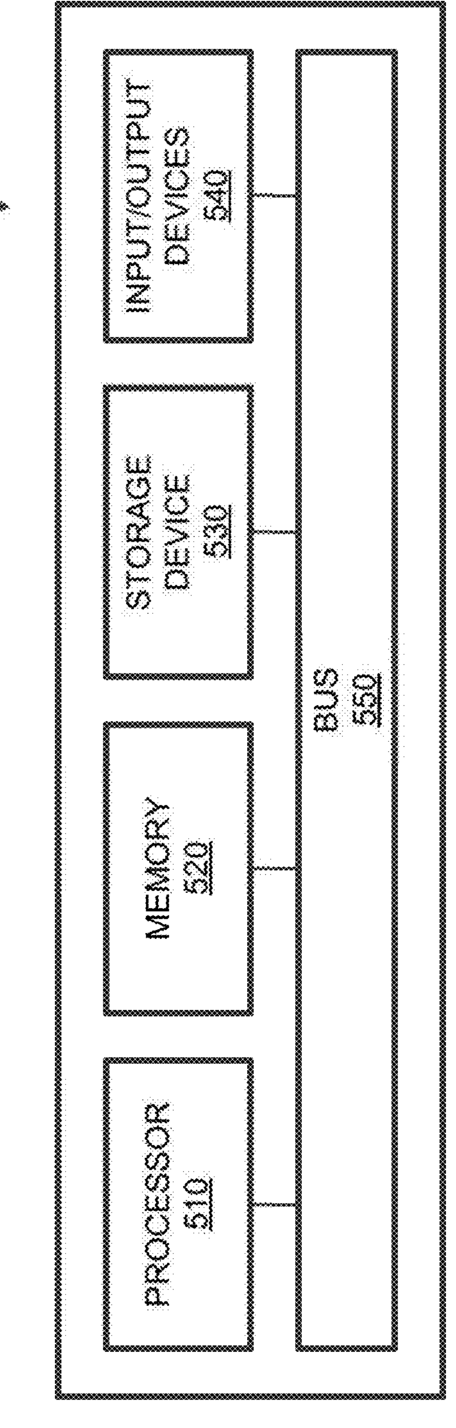
FIG. 5A depicts a block diagram illustrating an example of a computing system, in accordance with some implementations.

As shown in FIG. 5A, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions (such as the instruction to implement Algorithm Table B and/or process 400) for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540. The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces. According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet). In some implementations of the current subject matter, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities, computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

Figure 5B:
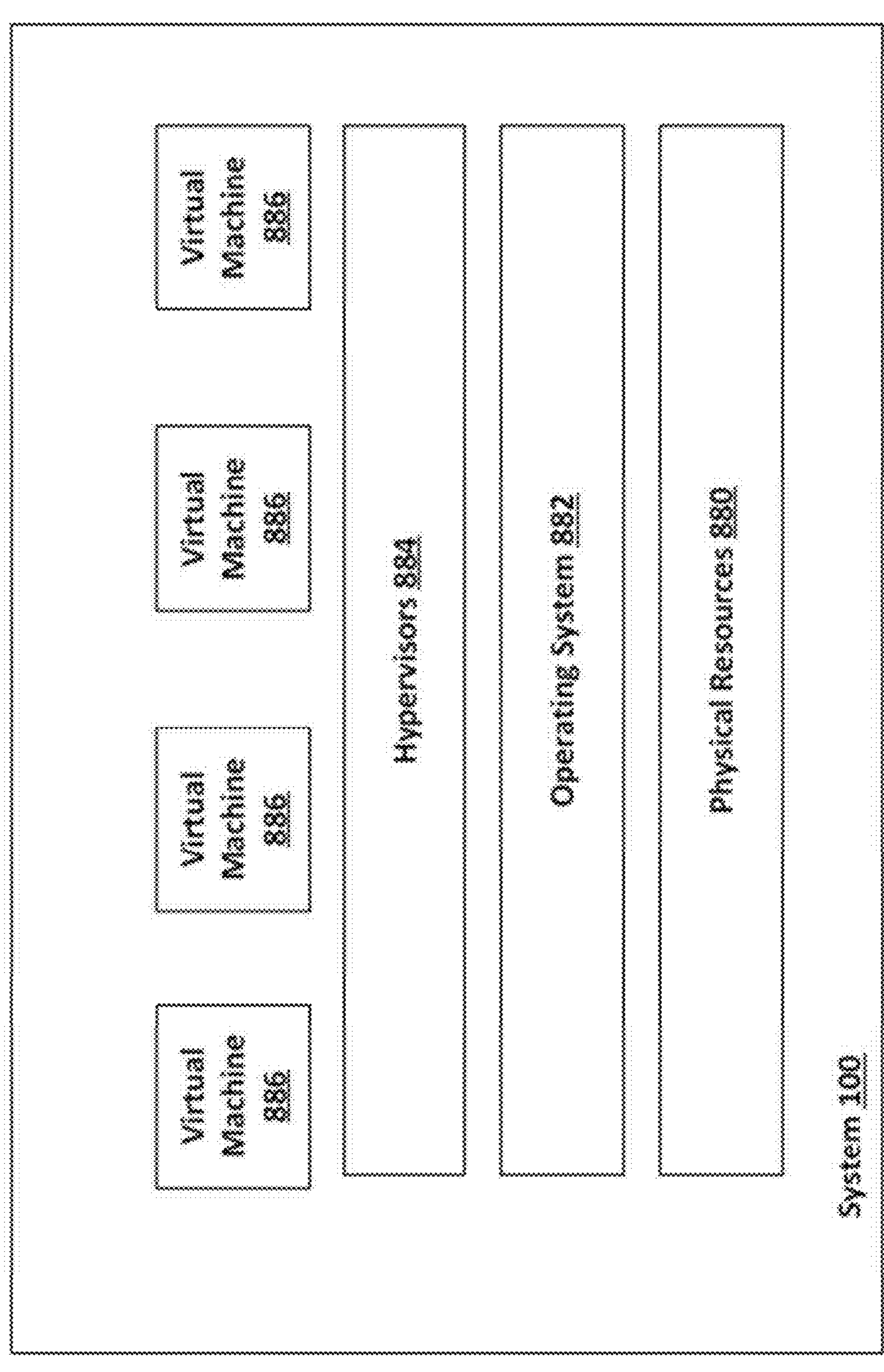
FIG. 5B depicts a block diagram illustrating another example of a computing system using virtual machines for cloud implementations, in accordance with some implementations.

FIG. 5B depicts an example implementation of the system 100 (of FIG. 1A). The system 100 may be implemented using various physical resources 880, such as at least one or more hardware servers, at least one storage, at least one memory, at least one network interface, and the like. The system 100 may also be implemented using infrastructure, as noted above, which may include at least one operating system 882 for the physical resources 880 and at least one hypervisor 884 (which may create and run at least one virtual machine 886). For example, the database execution engine 1500, SM 12, and/or other components at FIG. 1A may be run on a corresponding virtual machine 886.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1

A method comprising:

receiving a query request including a top k query operator over at last two fields comprising a first field and a second field, wherein k defines a threshold limit of query results for the top k query operator;

reading a first incoming element as a first value identifier of the first field;

selectively materializing a first value from the first value identifier;

comparing a top element of a heap to the first incoming element by at least:

comparing a first value materialized from the first value identifier to a first heap value of the top element of the heap, in response to the first value being less than the first heap value, selectively materializing a second value corresponding to the second field and inserting the first value and the second value into the heap, and in response to the first value not being less that the first heap value, skipping the first incoming element and proceeding, when available, to another incoming element; and in response to the comparing, responding to the query request by providing the heap including a top k set of query results.

Example 2

The method of Example 1, wherein the selectively materializing the first value from the first value identifier only materializes the first value corresponding to the first field and does not materialize the second value corresponding to the second field.

Example 3

The method of any of Examples 1-2, wherein the reading further comprises reading a row position of the second field.

Example 4

The method of any of Examples 1-3, wherein the selectively materializing the second value corresponding to the second field comprises using the row position to identify a second value identifier and materializing, based on the second value identifier and a second dictionary, the second value.

Example 5

The method of any of Examples 1-4, wherein the selectively materializing the first value from the first value identifier comprises using the first value identifier to materialize, based a first dictionary, the first value.

Example 6

The method of any of Examples 1-5, wherein the query request is received from a client device.

Example 7

The method of any of Examples 1-6, wherein in response to the first value being equal to the first heap value, materializing the second field to provide the second value and comparing the second value to a second heap value of the top element of the heap.

Example 8

The method of any of Examples 1-7, wherein in response to the heap not being full, a database execution engine reads the first value identifier of the first field and a second value identifier of the second field, materializes, based on the first value identifier and the second value identifier, the first value and the second value, and inserts the first value and the second value into the heap.

Example 9

A system comprising:
- at least one processor; and
- at least one memory comprising instructions which when executed by the at least one processor causes operations comprising:
- receiving a query request including a top k query operator over at last two fields comprising a first field and a second field, wherein k defines a threshold limit of query results for the top k query operator;
- reading a first incoming element as a first value identifier of the first field;
- selectively materializing a first value from the first value identifier;
- comparing a top element of a heap to the first incoming element by at least:
- comparing a first value materialized from the first value identifier to a first heap value of the top element of the heap,
- in response to the first value being less than the first heap value, selectively materializing a second value corresponding to the second field and inserting the first value and the second value the heap, and
- in response to the first value not being less that the first heap value, skipping the first incoming element and proceeding, when available, to another incoming element; and
- in response to the comparing, responding to the query request by providing the heap including a top k set of query results.

Example 10

The system of Example 9, wherein the selectively materializing the first value from the first value identifier only materializes the first value corresponding to the first field and does not materialize the second value corresponding to the second field.

Example 11

The system of any of claims 9-10, wherein the reading further comprises reading a row position of the second field.

Example 12

The system of any of claims 9-12, wherein the selectively materializing the second value corresponding to the second field comprises using the row position to identify a second value identifier and materializing, based on the second value identifier and a second dictionary, the second value.

Example 13

The system of any of claims 9-13, wherein the selectively materializing the first value from the first value identifier comprises using the first value identifier to materialize, based a first dictionary, the first value.

Example 14

The system of any of claims 9-13, wherein the query request is received from a client device.

Example 15

The system of any of claims 9-14, wherein in response to the first value being equal to the first heap value, materializing the second field to provide the second value and comparing the second value to a second heap value of the top element of the heap.

Example 16

The system of any of claims 9-15, wherein in response to the heap not being full, a database execution engine reads the first value identifier of the first field and a second value identifier of the second field, materializes, based on the first value identifier and the second value identifier, the first value and the second value, and inserts the first value and the second value into the heap.

Example 17

A non-transitory computer-readable storage medium comprising at least one memory comprising instructions which when executed by at least one processor causes operations comprising:
- receiving a query request including a top k query operator over at last two fields comprising a first field and a second field, wherein k defines a threshold limit of query results for the top k query operator;
- reading a first incoming element as a first value identifier of the first field;
- selectively materializing a first value from the first value identifier;
- comparing a top element of a heap to the first incoming element by at least:
- comparing a first value materialized from the first value identifier to a first heap value of the top element of the heap,
- in response to the first value being less than the first heap value, selectively materializing a second value corresponding to the second field and inserting the first value and the second value into the heap, and in response to the first value not being less that the first heap value, skipping the first incoming element and proceeding, when available, to another incoming element; and in response to the comparing, responding to the query request by providing the heap including a top k set of query results.

Example 18

The non-transitory computer-readable storage medium of Example 17, wherein the selectively materializing the first value from the first value identifier only materializes the first value corresponding to the first field and does not materialize the second value corresponding to the second field.

Example 19

The non-transitory computer-readable storage medium of any of Examples 17-18, wherein the reading further comprises reading a row position of the second field.

Example 20

The non-transitory computer-readable storage medium of any of Examples 17-19, wherein the selectively materializing the second value corresponding to the second field comprises using the row position to identify a second value identifier and materializing, based on the second value identifier and a second dictionary, the second value.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving a query request including a top k query operator over at least two fields comprising a first field and a second field, wherein k defines a threshold limit of query results for the top k query operator;

reading a first incoming element as a first value identifier of the first field;

selectively materializing a first value from the first value identifier;

executing first program code configured to perform to a heap updating algorithm for updating data stored in a heap, wherein the heap is a data structure stored in a memory, the heap updating algorithm comprising steps of comparing a top element of the heap to the first incoming element by at least:

comparing the first value materialized from the first value identifier to a first heap value of the top element of the heap, in response to the first value being less than the first heap value, selectively materializing a second value corresponding to the second field and inserting the first value and the second value into the heap, in response to the first value being equal to the first heap value, materializing the second field to provide the second value and comparing the second value to a second heap value of the top element of the heap, and in response to the first value being greater than the first heap value, skipping the first incoming element and proceeding, when available, to another incoming element;

in response to completing the heap updating algorithm, executing second program code configured to perform a heap sorting algorithm for sorting the data stored in the heap; and in response to completing the heap sorting algorithm, responding to the query request by providing the heap including a top k set of query results.

2. The method of claim 1, wherein the selectively materializing the first value from the first value identifier only materializes the first value corresponding to the first field and does not materialize the second value corresponding to the second field.

3. The method of claim 1, wherein the reading further comprises reading a row position of the second field.

4. The method of claim 3, wherein the selectively materializing the second value corresponding to the second field comprises using the row position to identify a second value identifier and materializing, based on the second value identifier and a second dictionary, the second value.

5. The method of claim 1, wherein the selectively materializing the first value from the first value identifier comprises using the first value identifier to materialize, based a first dictionary, the first value.

6. The method of claim 1, wherein the query request is received from a client device.

7. The method of claim 1, further comprising:

before executing the first program code, executing third program code configured to perform a heap creation algorithm for creating the heap and storing the heap in the memory, wherein the heap is empty at creation; and in response to the heap not being full, executing fourth program code configured to perform a heap insertion algorithm for inserting the first value and the second value into the heap, wherein the first program code is executed in response to the heap being full.

8. A system comprising:

at least one processor; and at least one memory comprising instructions which when executed by the at least one processor causes operations comprising:

receiving a query request including a top k query operator over at least two fields comprising a first field and a second field, wherein k defines a threshold limit of query results for the top k query operator;

reading a first incoming element as a first value identifier of the first field;

selectively materializing a first value from the first value identifier;

executing first program code configured to perform to a heap updating algorithm for updating data stored in a heap, wherein the heap is a data structure stored in a memory, the heap updating algorithm comprising steps of comparing a top element of the heap to the first incoming element by at least:

comparing the first value materialized from the first value identifier to a first heap value of the top element of the heap, in response to the first value being less than the first heap value, selectively materializing a second value corresponding to the second field and inserting the first value and the second value the heap, in response to the first value being equal to the first heap value, materializing the second field to provide the second value and comparing the second value to a second heap value of the top element of the heap, and in response to the first value being greater than the first heap value, skipping the first incoming element and proceeding, when available, to another incoming element;

in response to completing the heap updating algorithm, executing second program code configured to perform a heap sorting algorithm for sorting the data stored in the heap; and in response to completing the heap sorting algorithm, responding to the query request by providing the heap including a top k set of query results.

9. The system of claim 8, wherein the selectively materializing the first value from the first value identifier only materializes the first value corresponding to the first field and does not materialize the second value corresponding to the second field.

10. The system of claim 8, wherein the reading further comprises reading a row position of the second field.

11. The system of claim 10, wherein the selectively materializing the second value corresponding to the second field comprises using the row position to identify a second value identifier and materializing, based on the second value identifier and a second dictionary, the second value.

12. The system of claim 8, wherein the selectively materializing the first value from the first value identifier comprises using the first value identifier to materialize, based a first dictionary, the first value.

13. The system of claim 8, wherein the query request is received from a client device.

14. The system of claim 8, wherein in response to the heap not being full, a database execution engine reads the first value identifier of the first field and a second value identifier of the second field, materializes, based on the first value identifier and the second value identifier, the first value and the second value, and inserts the first value and the second value into the heap.

15. A non-transitory computer-readable storage medium comprising at least one memory comprising instructions which when executed by at least one processor causes operations comprising:

receiving a query request including a top k query operator over at least two fields comprising a first field and a second field, wherein k defines a threshold limit of query results for the top k query operator;

reading a first incoming element as a first value identifier of the first field;

selectively materializing a first value from the first value identifier;

executing first program code configured to perform to a heap updating algorithm for updating data stored in a heap, wherein the heap is a data structure stored in a memory, the heap updating algorithm comprising steps of comparing a top element of the heap to the first incoming element by at least:

comparing the first value materialized from the first value identifier to a first heap value of the top element of the heap, in response to the first value being less than the first heap value, selectively materializing a second value corresponding to the second field and inserting the first value and the second value into the heap, in response to the first value being equal to the first heap value, materializing the second field to provide the second value and comparing the second value to a second heap value of the top element of the heap, and in response to the first value being greater than the first heap value, skipping the first incoming element and proceeding, when available, to another incoming element;

in response to completing the heap updating algorithm, executing second program code configured to perform a heap sorting algorithm for sorting the data stored in the heap; and in response to completing the heap sorting algorithm, responding to the query request by providing the heap including a top k set of query results.

16. The non-transitory computer-readable storage medium of claim 15, wherein the selectively materializing the first value from the first value identifier only materializes the first value corresponding to the first field and does not materialize the second value corresponding to the second field.

17. The non-transitory computer-readable storage medium of claim 15, wherein the reading further comprises reading a row position of the second field.

18. The non-transitory computer-readable storage medium of claim 17, wherein the selectively materializing the second value corresponding to the second field comprises using the row position to identify a second value identifier and materializing, based on the second value identifier and a second dictionary, the second value.

* * * * *